US011600019B2

(12) United States Patent
Ramos et al.

(10) Patent No.: US 11,600,019 B2
(45) Date of Patent: Mar. 7, 2023

(54) IMAGE-BASED INVENTORY ESTIMATION

(71) Applicant: International Business Machines Corporation, Armonk, NY (US)

(72) Inventors: Igor S. Ramos, Round Rock, TX (US); Angelo Danducci, II, Austin, TX (US); Devon E. Mensching, Austin, TX (US); Kimberly J. Taft, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 16/578,623

(22) Filed: Sep. 23, 2019

(65) Prior Publication Data
US 2021/0090294 A1 Mar. 25, 2021

(51) Int. Cl.
*G06Q 10/08* (2012.01)
*G06T 7/80* (2017.01)
(Continued)

(52) U.S. Cl.
CPC ........... *G06T 7/80* (2017.01); *G06Q 10/0875* (2013.01); *G06T 7/50* (2017.01); *G06T 7/70* (2017.01);
(Continued)

(58) Field of Classification Search
None
See application file for complete search history.

(56) References Cited

U.S. PATENT DOCUMENTS 3,009,864 A1 8/2011 Linaker et al.
9,015,072 B2 4/2015 Wu et al.
(Continued)

FOREIGN PATENT DOCUMENTS

WO 2018078408 A1 5/2018
WO 2018129502 A1 7/2018
(Continued)

OTHER PUBLICATIONS

"Get the right number: Image Processing for Object counting", Aug. 7, 2014, 13 pages, <http://agradeit.com/blog/image-processing>.
(Continued)

*Primary Examiner* — Tyler W. Sullivan
(74) *Attorney, Agent, or Firm* — Michael O'Keefe

(57) ABSTRACT

In an approach to estimating product inventory count, one or more computer processors receive one or more images of one or more products residing on a product storage location from an image capturing device. Based on the received images, one or more computer processors determine a count of the one or more products. One or more computer processors determine a confidence in the count of the one or more products. In response to determining the confidence is below a threshold, one or more computer processors calculate a recommended position of the image capturing device to produce an improved image of the one or more products. One or more computer processors transmit instructions to the image capturing device to move to the recommended position. One or more computer processors determine whether the image capturing device is in the recommended position.

19 Claims, 5 Drawing Sheets

(51) Int. Cl.

| | | |
|---|---|---|
| *H04N 5/232* | (2006.01) | |
| *G06T 7/70* | (2017.01) | |
| *G06T 7/50* | (2017.01) | |
| *G06V 10/10* | (2022.01) | |
| *G06Q 10/0875* | (2023.01) | |

(52) U.S. Cl.
CPC ......... *G06V 10/10* (2022.01); *H04N 5/23203* (2013.01); *H04N 5/23222* (2013.01); *H04N 5/23299* (2018.08); *G06T 2207/20061* (2013.01); *G06T 2207/30242* (2013.01); *G06T 2207/30244* (2013.01)

(56) References Cited

U.S. PATENT DOCUMENTS

| | | | |
|---|---|---|---|
| 9,547,838 B2 | 1/2017 | Larsen | |
| 9,990,535 B2 | 6/2018 | Phillips et al. | |
| 9,996,818 B1 | 6/2018 | Ren et al. | |
| 10,049,500 B2 | 8/2018 | Morrison | |
| 11,209,832 B2 * | 12/2021 | Deyle | G05D 1/0214 |
| 2010/0039513 A1 | 2/2010 | Glickman et al. | |
| 2013/0182114 A1 | 7/2013 | Zhang et al. | |
| 2015/0046299 A1 * | 2/2015 | Yan | G06Q 10/087 705/28 |
| 2018/0032832 A1 * | 2/2018 | Shen | G06T 7/13 |
| 2018/0089613 A1 | 3/2018 | Chen et al. | |
| 2018/0107999 A1 * | 4/2018 | Rizzolo | G06K 19/06028 |
| 2019/0034864 A1 * | 1/2019 | Skaff | G06K 7/1413 |
| 2019/0180150 A1 * | 6/2019 | Taylor | G06V 10/446 |
| 2019/0215424 A1 * | 7/2019 | Adato | G06V 40/10 |
| 2019/0236530 A1 * | 8/2019 | Cantrell | G06V 40/23 |
| 2020/0327315 A1 * | 10/2020 | Mullins | H04N 7/181 |
| 2021/0097484 A1 * | 4/2021 | Ramos | G06K 9/6201 |

FOREIGN PATENT DOCUMENTS

| | | | | |
|---|---|---|---|---|
| WO | WO-2019060767 A1 * | 3/2019 | ............ | B25J 9/1697 |
| WO | WO-2019108146 A1 * | 6/2019 | ......... | G06K 9/00771 |

OTHER PUBLICATIONS

"Using Object Detection for Complex Image Classification Scenarios", Microsoft, Printed Jul. 18, 2019, 11 pages, <https://www.microsoft.com/developerblog/2017/07/31/using-object-detection-complex-image-classification-scenarios/>.

Baygin et al., "An Image Processing based Object Counting Approach for Machine Vision Application", International Conference on Advances and Innovations in Engineering (ICAIE), Elazig, Turkey, May 10-12, 2017, 5 pages, <https://arxiv.org/pdf/1802.05911.pdf>.

Daftary, Jay, "Calculate the distance to object from camera", TechJini, Dec. 24, 2012, 8 pages, <https://www.techjini.com/blog/calculate-the-distance-to-object-from-camera/>.

Holem et al, "Putting Objects in Perspective", International Journal of Computer Vision, vol. 80, 2008, 13 pages, <http://dhoiem.cs.illinois.edu/publications/hoiem_cvpr06.pdf>.

Holley, Peter, "Giant Food Stores will place robotic assistants at 172 locations, company says", The Washington Post, Jan. 17, 2019, 3 pages, <https://www.washingtonpost.com/technology/2019/01/14/giant-food-stores-will-place-robotic-assistants-inside-locations-company-says/?utm_term=.74d66536ada7>.

Koschan et al., "Detection and Classification of Edges in Color Images", Signal Processing Magazine, Special Issue an Color Image Processing, 2005, vol. 22, No. 1, pp. 64-73, <https://www.imaging.utk.edu/publications/papers/2005/koschan_spm05.pdf>.

Rosebrock, Adrian, "Measuring size of objects in an image with OpenCV", Pyimagesearch—Image Processing Tutorials, Mar. 28, 2016, 102 pages, <https://www.pyimagesearch.com/2016/03/28/measuring-size-of-objects-in-an-image-with-opencv/>.

* cited by examiner

IMAGE-BASED INVENTORY ESTIMATION

BACKGROUND OF THE INVENTION

The present invention relates generally to the field of image analysis, and more particularly to estimating product inventory count based on images of the product.

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can locate items from within the store, pick the items from inventory, and take them to a cashier for purchase, rental, etc.

SUMMARY

Embodiments of the present invention disclose a method, a computer program product, and a system for estimating product inventory count. The method may include one or more computer processors receiving one or more images of one or more products residing on a product storage location from an image capturing device. Based on the received images, one or more computer processors determine a count of the one or more products. One or more computer processors determine a confidence in the count of the one or more products. In response to determining the confidence is below a threshold, one or more computer processors calculate a recommended position of the image capturing device to produce an improved image of the one or more products. One or more computer processors transmit instructions to the image capturing device to move to the recommended position. One or more computer processors determine whether the image capturing device is in the recommended position.

DETAILED DESCRIPTION

Retailers, warehouses, etc., have the need for inventorying their products. One example approach of performing inventory is through imaging, either by an autonomous robot or an employee that moves down an aisle and captures images of products. One issue with the imaging inventory process is that in order for the images to give a good count of inventory beyond just determining whether a product storage location, such as a shelf, is empty or not, there is a need to determine the depth of duplicate objects, for a more accurate product count that takes into account hidden product rows. A typical image of a shelf, taken perpendicular to the shelf, can only display whether a shelf is empty or not, for a given frontage space. Utilizing image capture angles, products in deeper rows on the shelf can be counted or estimated. Knowing the optimal angle is a problem for both humans and machines.

Embodiments of the present invention recognize that the process of taking inventory with images can be improved by performing a real-time analysis of camera angles for optimal object detection. Utilization of camera angles aids in counting products in deep rows on a shelf. Embodiments of the present invention also recognize that the analysis gives a more reliable inventory count, enabling businesses to use the data for notifying employees to restock shelves, as well as for ordering more products, detecting a possible theft, and determining a rate at which products are purchased. Additionally, embodiments of the present invention recognize efficiency may be gained by automating the manual process of determining the best camera position for inventory counting. Implementation of embodiments of the invention may take a variety of forms, and exemplary implementation details are discussed subsequently with reference to the Figures.

Figure 1:
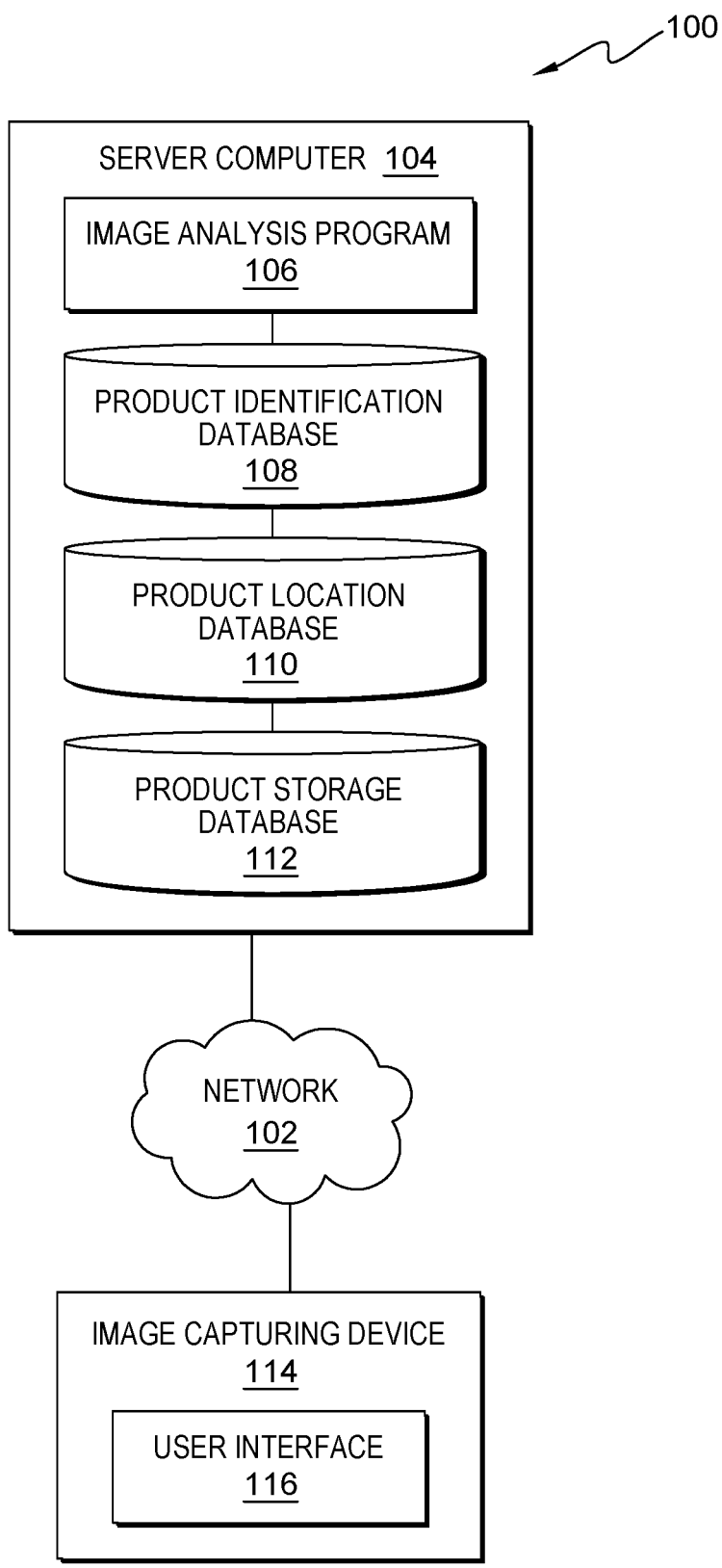
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and image capturing device 114, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104 and image capturing device 114, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with image capturing device 114 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes image analysis program 106, product identification database 108, product location database 110, and product storage database 112. Server computer 104 may include internal and external hardware components, as depicted and described in further detail with respect to FIG. 4.

In the depicted embodiment, image analysis program 106 resides on server computer 104. In another embodiment, image analysis program 106 may be integrated into image capturing device 114. Image analysis program 106 provides a recommendation for camera positioning for providing the best image for inventory counting of products on shelves. Image analysis program 106 receives an image of one or more products on a shelf from image capturing device 114. Image analysis program 106 retrieves identification of the product in the received image. Image analysis program 106 determines the location of the product in the received image. Image analysis program 106 determines a count of the product on the shelf from the image. Image analysis program 106 determines a confidence in the count of the product in the image based on the image. Image analysis program 106 determines if the confidence is below a threshold. If the confidence is below the threshold, then image analysis program 106 measures the distance from image capturing device 114 to the product on the shelf. Image analysis program 106 measures the gap between the top of the product and the bottom of the shelf above the product. Image analysis program 106 determines the depth of the shelf. Image analysis program 106 determines the angle to which image capturing device 114 must be tilted to capture a better image of the product on the shelf. Image analysis program 106 determines a recommendation for positioning of image capturing device 114, repositions image capturing device 114, and the process is repeated. Once the confidence is at or above the threshold, image analysis program 106 estimates an inventory quantity and sends an inventory estimate. Image analysis program 106 is depicted and described in further detail with respect to FIG. 2 and FIG. 3.

Product identification database 108, product location database 110, and product storage database 112 are each a repository for data used by image analysis program 106. In the depicted embodiment, product identification database 108, product location database 110, and product storage database 112 reside on server computer 104. In another embodiment, product identification database 108, product location database 110, and product storage database 112 may each reside elsewhere within distributed data processing environment 100 provided image analysis program 106 has access to product identification database 108, product location database 110, and product storage database 112. A database is an organized collection of data. Product identification database 108, product location database 110, and product storage database 112 can each be implemented with any type of storage device capable of storing data and configuration files that can be accessed and utilized by image analysis program 106, such as a database server, a hard disk drive, or a flash memory. Product identification database 108 stores product identification data used by image analysis program 106 to identify one or more products in an image. For example, product identification data may include, but is not limited to, a product name, a product description, a packaging type, a packaging color, a packaging description, a price associated with a product, one or more ingredients of a product, a quantity of the product within the packaging, a barcode associated with a product, etc. Product location database 110 stores product location data used by image analysis program 106 to determine where in a store, warehouse, etc., the product is located, i.e., correlating the product identification to an assigned location. For example, product location data may include, but is not limited to, a shelf number, a shelf location, one or more GPS coordinates associated with a shelf, a quick response (QR) code associated with a shelf, or any other location data known in the art. By correlating the product to the location in which the product resides, image analysis program 106 prevents overwriting an inventory estimate that was already completed for a different shelf. Product storage database 112 stores product storage data used by image analysis program 106 to determine details of product location. For example, product storage data may include, but is not limited to, a depth of a shelf, a width of a shelf, a height of a shelf, a quantity of shelves in a shelving unit, etc.

Image capturing device 114 captures images of one or more products on a shelf for the purpose of estimating an inventory count of the products. Image capturing device 114 may be one of a plurality of types of camera, including, but not limited to, pin-hole, stereo, omni-directional, non-central, infrared, video, digital, three dimensional, panoramic, filter-based, wide-field, narrow-field, telescopic, microscopic, etc. In some embodiments, image capturing device 114 includes any device capable of imaging a portion of the electromagnetic spectrum. In one embodiment, image capturing device 114 is a component of an unmanned aerial vehicle (UAV) or autonomous robot used to gather product and inventory data. In another embodiment, image capturing device 114 may be integrated into a smart phone or other device used by an employee or a customer to gather product and inventory data. In a further embodiment, image capturing device 114 may be integrated into a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In some embodiments, image capturing device 114 includes a plurality of image capturing devices which are positioned around a storage location, such as a store or warehouse, and mounted such that image analysis program 106 can change the angle of image capturing device 114. Image capturing device 114 includes an instance of user interface 116. In some embodiment, image capturing device 114 includes one or more location sensors, such as a global positioning system (GPS), such that image analysis program 106 can detect the location and angle of image capturing device 114 with respect to one or more products.

User interface 116 enables a user of image capturing device 114 to interact with image analysis program 106. In one embodiment, user interface 116 is a voice user interface (VUI) for a user of image capturing device 114 to access via voice commands in natural language. In one embodiment, user interface 116 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 116 may also be mobile application software. In an example, mobile application software, or an "app," is a computer program designed to run on smart phones, tablet computers and other mobile devices. User interface 116 enables a user to send images to and receive instructions from image analysis program 106.

Figure 2B:
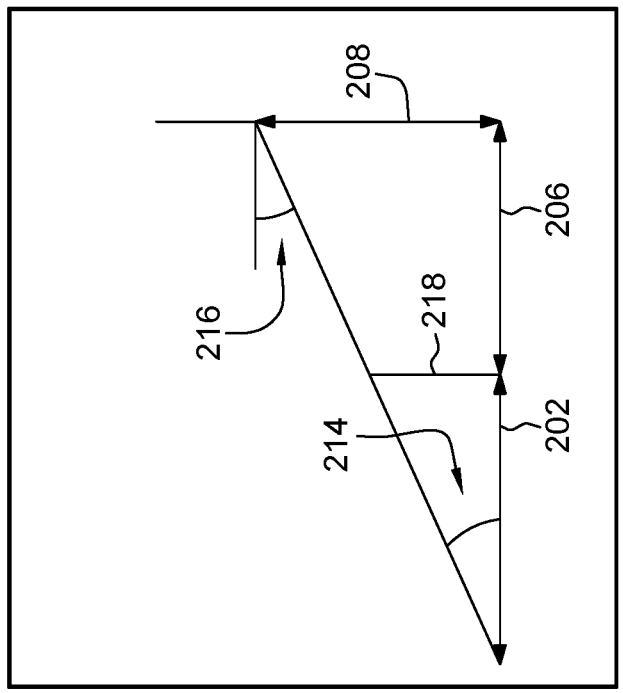
FIG. 2B illustrates dimensions, geometry, and calculations associated with a recommended positioning of the image capturing device, in accordance with an embodiment of the present invention.
Figure 2A:
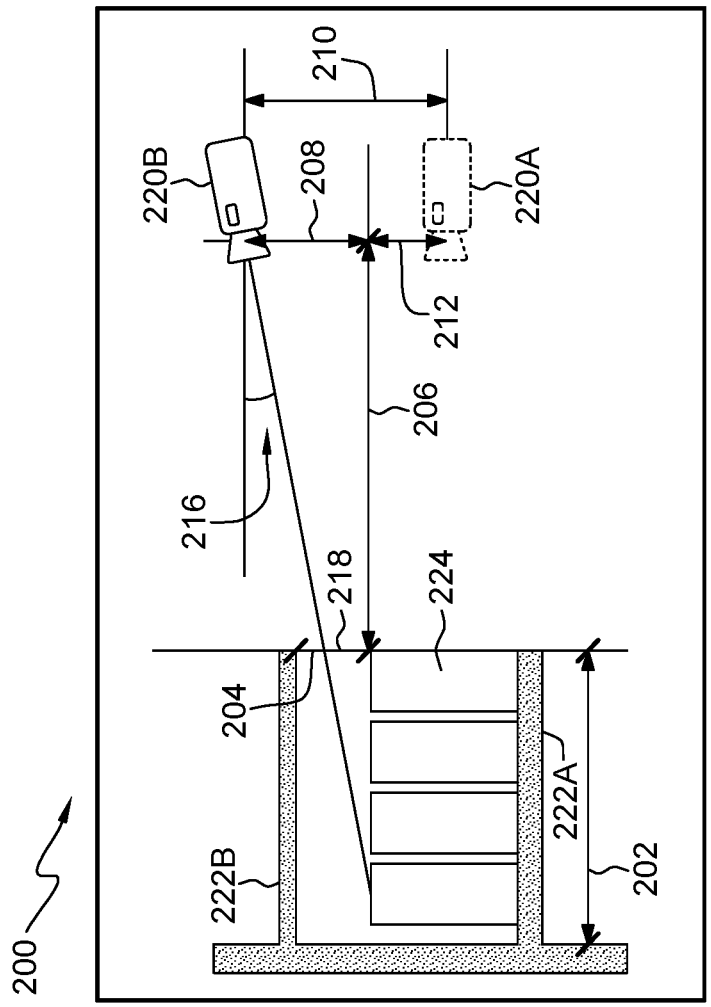
FIG. 2A illustrates an example of positioning of an image capturing device for inventory estimation, in accordance with an embodiment of the present invention.

FIG. 2A illustrates example 200 of positioning of image capturing device 114 for inventory estimation, in accordance with an embodiment of the present invention. In example 200, products 224 reside on top of shelf 222A and below shelf 222B, i.e., the bottom surface of shelf 222B is directly above products 224. In the example, initial camera position 220A and adjusted camera position 220B represent the positioning of image capturing device 114, as discussed with respect to FIG. 1. At initial camera position 220A, image capturing device 114 is pointed perpendicular to the front facing surface of products 224, and therefore only the front facing product of products 224 is visible in an image captured by image capturing device 114. When image capturing device 114 is placed at the height and angle of adjusted camera position 220B, the image captured by image capturing device 114 reveals products behind the front facing product of products 224. The elements included in example 200 are defined as follows: shelf depth 202 is the depth of shelf 222A and of shelf 222B; distance 204 is the vertical distance between the top surface of products 224 and the bottom surface of shelf 222B; distance 206 is the horizontal distance between image capturing device 114 and the front of products 224; distance 208 is the vertical distance above the top surface of products 224 to which to adjust image capturing device 114 for capturing a better image of products 224, i.e., the vertical distance between the top surface of products 224 and adjusted camera position 220B; recommended distance 210 is the vertical distance from initial camera position 220A to adjusted camera position 220B; distance 212 is the vertical distance from the top of products 224 to initial camera position 220A; distance 218 is a fraction of distance 204, where the fraction is chosen to maximize the resolution of the image; angle 216 is the angle at which to tilt image capturing device 114 to achieve adjusted camera position 220B. In an embodiment where there is no shelf above the product or the shelf above the product is significantly less deep than the shelf on which the product resides, distance 218 can be any distance provided that angle 216 is not too low as would cause distortion in the image of the back of the shelf. In an embodiment, distance 208 is limited to the reach of the person or robot using image capturing device 114.

FIG. 2B illustrates dimensions, geometry, and calculations associated with recommended positioning of image capturing device 114, in accordance with an embodiment of the present invention. To determine the recommended changes to the position of image capturing device 114 to capture an image suited for counting inventory, image analysis program 106 solves the geometric distances shown in FIG. 2B for distance 208 (as described with respect to FIG. 2A) recommended distance 210 (as described with respect to FIG. 2A), and angle 216 (as described with respect to FIG. 2A). To determine angle 216, image analysis program 106 computes the tangent of angle 214 as distance 218 (as described with respect to FIG. 2A) divided by shelf depth 202 (as described with respect to FIG. 2A), and angle 216 is the negative of the result. In the example, distance 218 is half of distance 204 (as described with respect to FIG. 2A), thus pointing the center of image capturing device 114 into the center of the gap between products 224 and shelf 222B. To determine distance 208, image analysis program 106 computes the result of the tangent of angle 214 multiplied by the sum of shelf depth 202 and distance 206. Recommended distance 210 is the sum of distance 208 and distance 212 (as described with respect to FIG. 2A). For example, if shelf depth 202 is 40 centimeters, distance 206 is 100 cm, distance 212 is 5 cm, and distance 204 is 10 cm, then solving for angle 214, the tangent of angle 214 is equal to 5 cm/40 cm, therefore angle 214 is 7 degrees. Thus, angle 216 equals −7 degrees. Distance 208 equals tan (7 degrees) multiplied by (40 plus 100), therefore distance 208 equals 17.5 cm. Recommended distance 210 is the sum of 17.5 cm and 5 cm, i.e., 22.5 cm. Thus, image analysis program 106 recommends that image capturing device 114 be adjusted up 22.5 cm and tilted down 7 degrees.

Figure 3:
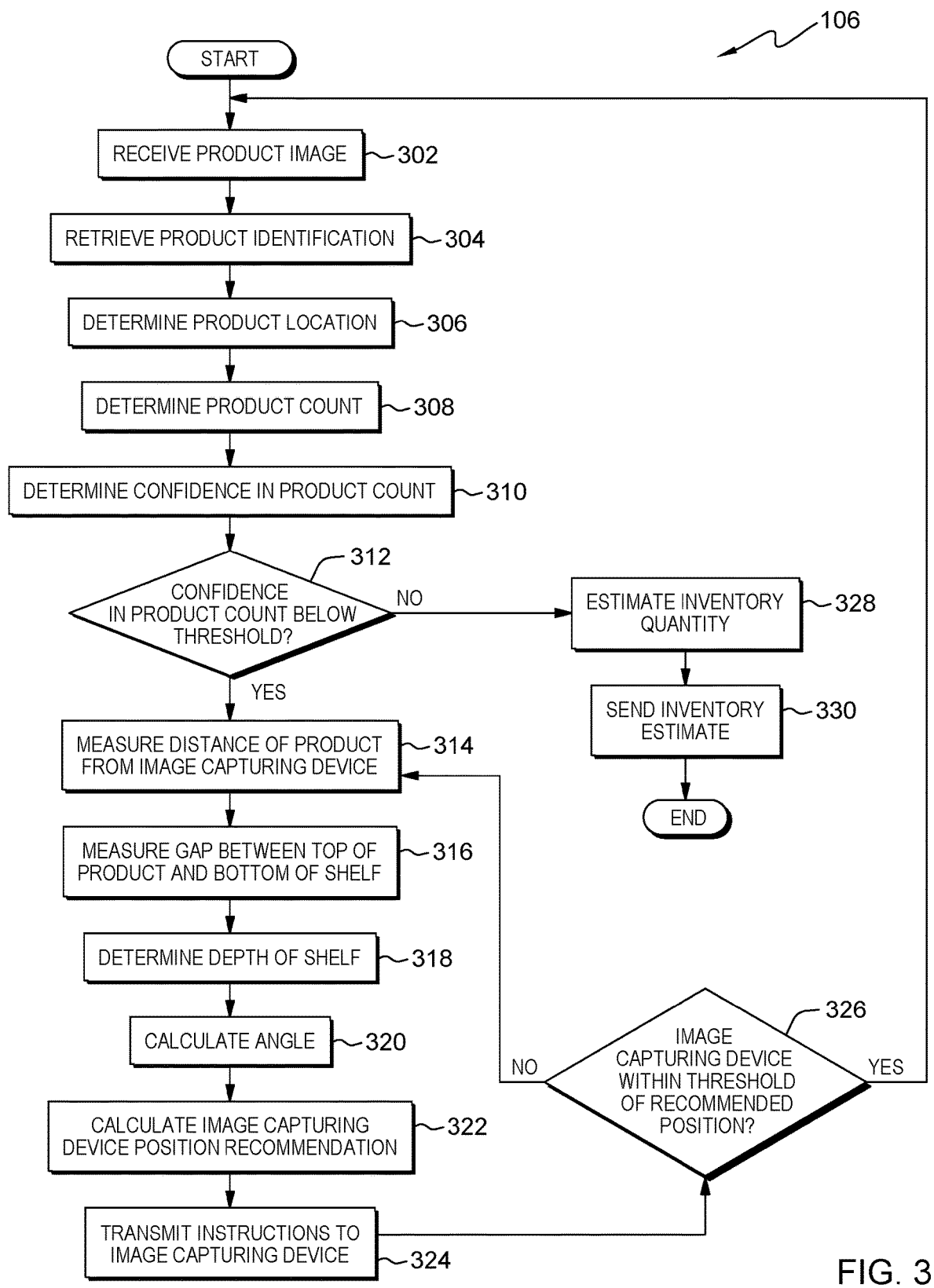
FIG. 3 is a flowchart depicting operational steps of an image analysis program, on a server computer within the distributed data processing environment of FIG. 1, for recommending image capturing device positioning for inventory data collection, in accordance with an embodiment of the present invention.

FIG. 3 is a flowchart depicting operational steps of image analysis program 106, on server computer 104 within distributed data processing environment 100 of FIG. 1, for recommending image capturing device 114 positioning for inventory data collection, in accordance with an embodiment of the present invention.

Image analysis program 106 receives a product image (step 302). In a store, warehouse, etc., that employs image analysis program 106 to estimate inventory counts of products, image capturing device 114 captures an image of one or more products on a shelf. Depending on the capability of image capturing device 114, the captured image may be a still photograph, video, and the like. When the user of image capturing device 114 sends the image to image analysis program 106, via user interface 116, image analysis program 106 receives the image of one or more products.

Image analysis program 106 retrieves product identification (step 304). Image analysis program 106 compares the product in the received image to product identification data in product identification database 108. In one embodiment, image analysis program 106 uses image classification or image recognition to identify the product in the image by comparing the name or logo on the product to names or logos stored in product identification database 108. In another embodiment, if a product barcode is visible in the image, then image analysis program 106 uses barcode reading technology to identify the product. In one embodiment, image analysis program 106 uses the product identification to reconcile the inventory count of a product. In another embodiment, image analysis program 106 derives insights from the product identification that may assist in inventory count by providing information about the expected shape of a product, for example, whether a product is in a can, a bottle, or a box. Image analysis program 106 uses the shape of a product to better utilize a depth edge detection algorithm, as will be discussed later.

Image analysis program 106 determines product location (step 306). Image analysis program 106 determines the physical location of the product in order to identify the specific shelf on which the product resides. Shelf location may also assist in product identification, as certain products may always be placed on specific shelves. Image analysis program 106 determines the location by using one or more techniques known in the art, for example, GPS coordinates. In another embodiment, image analysis program 106 may determine the product or shelf location via a QR code or barcode located on the shelf. In the embodiment, the QR code or barcode may include additional information, such as the depth or size of the shelf In a further embodiment, image analysis program 106 may retrieve the product location based on data in product location database 110. In yet another embodiment, the product location may be included in metadata associated with the received image. In another embodiment, image analysis program 106 may determine the product location by reading a label on the shelf using one or more natural language processing techniques. For example, the label may list the location as aisle x, bay y, and shelf z.

Image analysis program 106 determines product count (step 308). Image analysis program 106 counts the objects in the received image. In one embodiment, image analysis program 106 uses a feature extraction technique as a classification model to count and detect edges of one or more objects, in order to estimate the amount of product stock on a given shelf. In one embodiment, image analysis program 106 uses a Hough transform, as would be recognized by a person of skill in the art, as the feature extraction technique. The Hough transform, a depth edge detection algorithm, uses edge detection to analyze object depth and can be configured to account for the shape of the object, for example, whether the object is an ellipse, a rectangle, a square, etc. In an embodiment, image analysis program 106 may also determine product orientation using the Hough transform. For example, based on edge detection, image analysis program 106, knowing from product identification data that the product shape is a cube, determines the product is perpendicular to image capturing device 114 because image analysis program 106 only detects four edges, indicating a flat plane. In an embodiment, the Hough transform can also be trained to detect a plurality of other features, for example, shelves and empty shelf space adjacent to a product on the shelf In another embodiment, image analysis program 106 may utilize a depth sensor, such as an ultrasonic sensor, to determine empty shelf space. In one embodiment, image analysis program 106 uses the information on the depth of the shelf as a hard limit to the estimation of the product count, as there cannot be more product on the shelf than the depth of the shelf allows.

Image analysis program 106 determines a confidence in the product count (step 310). In an embodiment, image analysis program 106 analyzes the received image to determine the orientation of the product, for example, if the product on the shelf is displayed in the image as perpendicular to image capturing device 114, allowing only the row of products on the front of the shelf to be visible. In the embodiment, image analysis program 106 determines that counting product behind the first row of product via image classification is difficult, if not impossible, due to lack of object depth visibility, and therefore image analysis program 106 determines that confidence in the product inventory count based on the received image is low. In one embodiment, image analysis program 106 may determine confidence based on comparing the received image to information about the shelf, stored in product storage database 112. For example, if image analysis program 106 determines from the data in product storage database 112 that the shelf in the image is 36 cm deep, but the product, as described in product identification database 108, is only 10 cm deep, then image analysis program 106 determines that there may be product behind the product visible in the front row.

Image analysis program 106 determines whether the confidence in the product count is below a threshold (decision block 312). In one embodiment, the confidence threshold is set by a system administrator. For example, the system administrator may pre-define the confidence threshold to be 80 percent. In another embodiment, a store owner or employee may customize the confidence threshold based on variables such as the product type, product price, sales trends, etc. For example, a store owner may want to keep a very accurate count of inventory of high-priced items versus low priced items, and therefore require a high confidence in the inventory count.

If image analysis program 106 determines the confidence in the product count is below the threshold ("yes" branch, decision block 312), then image analysis program 106 measures the distance of the product from image capturing device 114 (step 314). Referring back to FIG. 2A, distance 206 is the horizontal distance between image capturing device 114 and the front of products 224. Image analysis program 106 may measure this distance using one of a plurality of methods known in the art. For example, image analysis program 106, using the fact that the ratio of the size of the object in an image and the height of the object in real life is the same as the ratio between the focal length and distance between the object and the imaging device, calculates the distance between image capturing device 114 and the front of products 224 as follows:

$$distance = \frac{(focal\ length * real\ height\ of\ object * camera\ frame\ height\ in\ device)}{(image\ height * sensor\ height)}$$

Image analysis program 106 measures the gap between the top of the product and the bottom of the shelf above the product (step 316). Referring back to FIG. 2A, distance 204 is the vertical distance between the top of products 224 and the bottom of shelf 222B. Image analysis program 106 may measure this distance using one of a plurality of methods known in the art. For example, image analysis program 106, using a pixels per metric ratio based on the known width of another object, calculates the vertical distance between the top of products 224 and the bottom of shelf 222B using the following ratio:

$$pixels\ per\ metric = \frac{object\ width\ in\ pixels}{known\ object\ width}$$

In an embodiment, if the gap between the top of the product and the bottom of the shelf above the product is below a threshold distance, or the depth of the shelf above the product is greater than the shelf on which the product resides, making imaging of the products on the back of the shelf difficult or impossible, then image analysis program 106 requests, via user interface 116, that image capturing device 114 capture a side angle image if there is space on either side of the products.

Image analysis program 106 determines the depth of the shelf (step 318). In one embodiment, image analysis program 106 retrieves the shelf depth from product storage database 112. For example, the depth of the shelf identified by shelf location may be stored in product storage database 112. In another example, shelf depths stored in product storage database 112 may be for typical storage units, such as 35 inches for a refrigerator shelf. In another embodiment, image analysis program 106 may calculate the depth of the shelf using product identification data that defines the depth of the product in the image and knowledge of a quantity of rows of products that typically reside on the shelf. In yet another embodiment, image analysis program 106 may calculate the depth of the shelf using same method used for measuring the distance of the product from image capturing device 114, as discussed with respect to step 314. In a further embodiment, image analysis program 106 may calculate the depth of the shelf using same method used for measuring the gap between the top of the product and the bottom of the shelf above the product, as discussed with respect to step 316. In yet another embodiment, image analysis program 106 may use a sensor, such as an ultrasonic sensor, to determine the depth of the shelf. In the embodiment, the sensor may reside in image capturing device 114 or the sensor may be mounted in proximity to the shelf.

Image analysis program 106 calculates an angle (step 320). In order to recommend a position to which to adjust image capturing device 114, image analysis program 106 calculates the angle to tilt image capturing device 114 for better product visibility. As discussed with respect to FIG. 2B, to determine angle 216, image analysis program 106 computes the tangent of angle 214 as distance 218 divided by shelf depth 202 and solving for angle 214. Angle 216 is the negative of the result.

Image analysis program 106 calculates a recommendation for the position of image capturing device 114 (step 322). As discussed with respect to FIG. 2B, to determine distance 208, image analysis program 106 computes the result of the tangent of angle 214 multiplied by the sum of shelf depth 202 and distance 206. Recommended distance 210 is the sum of distance 208 and distance 212. In an embodiment, image analysis program 106 computes distance 212 via perspective projection measurements, as would be recognized by a person skilled in the art. Image analysis program 106 recommends moving image capturing device 114 to the position of recommended distance 210 at an angle of angle 216 to better capture an image that takes the depth of the shelf into account for taking inventory of products. In one embodiment, image analysis program 106 may recommend a distance less than or greater than distance 206 with which to move image capturing device 114 in the horizontal direction using one or more sensors in image capturing device 114 to calculate the distance, as described previously.

Image analysis program 106 transmits instructions to image capturing device 114 to move to the recommended position (step 324). In an embodiment where image capturing device 114 is integrated into a UAV, an autonomous robot, or another automated system, image analysis program 106 transmits instructions to reposition image capturing device 114 to the recommended position. In an embodiment where image capturing device 114 is integrated into a smart phone or other device used by an employee or a customer, image analysis program 106 sends the recommendation, via user interface 116, to the device. For example, image analysis program 106 may send the recommendation via a text, an email, an audible message, etc.

In one embodiment, image capturing device 114 is associated with an employee or a customer of the venue. In the embodiment, if image analysis program 106 determines that the employee or customer has moved to a location such that image capturing device 114 is within a threshold position of the recommended position in an area of interest, then image analysis program 106 automatically triggers image capturing device 114 to capture an image.

Image analysis program 106 determines whether image capturing device 114 is within a threshold of the recommended position (decision block 326). Using one or more techniques as would be recognized by a person of skill in the art, image analysis program 106 determines the current location of image capturing device 114. For example, image analysis program 106 may detect GPS coordinates of image capturing device 114. In one embodiment, image analysis program 106 determines whether the current location of image capturing device 114 is within a pre-defined threshold distance of the recommended position. In another embodiment, image analysis program 106 determines whether image capturing device is within a pre-defined threshold angle of the recommended position. In a further embodiment, image analysis program 106 determines whether image capturing device is within a pre-defined threshold distance and a pre-defined threshold angle of the recommended position.

If image analysis program 106 determines image capturing device 114 is within a threshold of the recommended position ("yes" branch, decision block 326), then image analysis program 106 returns to step 302 and receives a new product image from image capturing device 114. In an embodiment, image analysis program 106 then generates a new Hough transform and counts the number of edges to validate the new image produces an increase in the inventory count which is proportional to the Hough transform output. In an embodiment where image capturing device 114 provides a real-time video stream instead of discrete photographs, image analysis program 106 dynamically generates the Hough transform along with movement of image capturing device 114 and registers a maximum count of the products.

If image analysis program 106 determines image capturing device 114 is not within a threshold of the recommended position ("no" branch, decision block 326), then image analysis program 106 returns to step 314 to begin to calculate and transmit new instructions. In an embodiment, image analysis program 106 calculates the difference between the current position of image capturing device 114 and the recommended position and transmits additional instructions to reposition image capturing device 114 to within a threshold of the recommended position.

If image analysis program 106 determines the confidence in the product count is not below the threshold ("no" branch, decision block 312), then image analysis program 106 estimates an inventory quantity (step 328). Once movement of image capturing device 114 is sufficient to produce an improved image for which the confidence in the count meets the threshold, image analysis program 106 estimates the inventory quantity from the image. In one embodiment, image analysis program 106 creates an inventory report or table with columns such as product identification (e.g., product name, universal product code (UPC), etc.), physical location, and estimated inventory quantity and populates the table with the appropriate data.

Image analysis program 106 sends the inventory estimate (step 330). In an embodiment, image analysis program 106 sends the inventory estimate to a user, such as a store owner, a product distributor, or any other user that uses the data. For example, image analysis program 106 may send the inventory estimate via a text, an email, an audible message, etc. In one embodiment, if the inventory estimate is below a threshold, then image analysis program 106 automatically sends an order for additional product. In another embodiment, if the inventory estimate is below a threshold, then image analysis program 106 automatically sends an alert to users, such as the store owner, distributor, or consumers known to regularly purchase the product, to let the users know that inventory is low. In one embodiment, image analysis program 106 stores the inventory estimate. For example, image analysis program 106 may store the inventory estimate in product identification database 108 and may associate the inventory estimate with the identified product. In another example, image analysis program 106 may store the inventory estimate in product location database 110 and may associate the inventory estimate with the product location. In another example, image analysis program 106 may store the inventory estimate in product storage database 112 or any other available database (not shown) within distributed data processing environment 100.

Figure 4A:
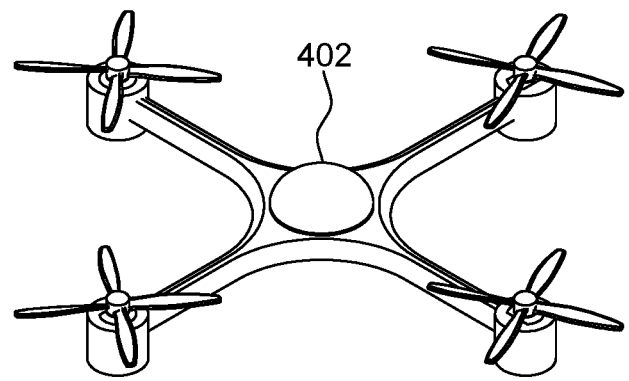
FIG. 4A illustrates a first embodiment of the image capturing device.

FIG. 4A illustrates a first embodiment of image capturing device 114. In the embodiment, UAV 402 includes image capturing device 114. In addition, image analysis program 106 is integrated into image capturing device 114. UAV 402 receives instructions from image analysis program 106 to adjust UAV 402 to a recommended position for capturing an image of one or more products. The depiction of UAV 402 is an example of an unmanned aerial vehicle (UAV), and embodiments of UAV 402 are not limited to the configuration shown in FIG. 4A. In one embodiment, UAV 402 processes instructions to capture images of a given area while maintaining at least a pre-defined distance from one or both of employees and customers of a given venue. For example, UAV 402 waits for customers and employees to leave an area, such as an aisle, of the venue before proceeding to move to that area and capture the images. In one embodiment, UAV 402 systematically scans the venue to provide updated images.

Figure 4B:
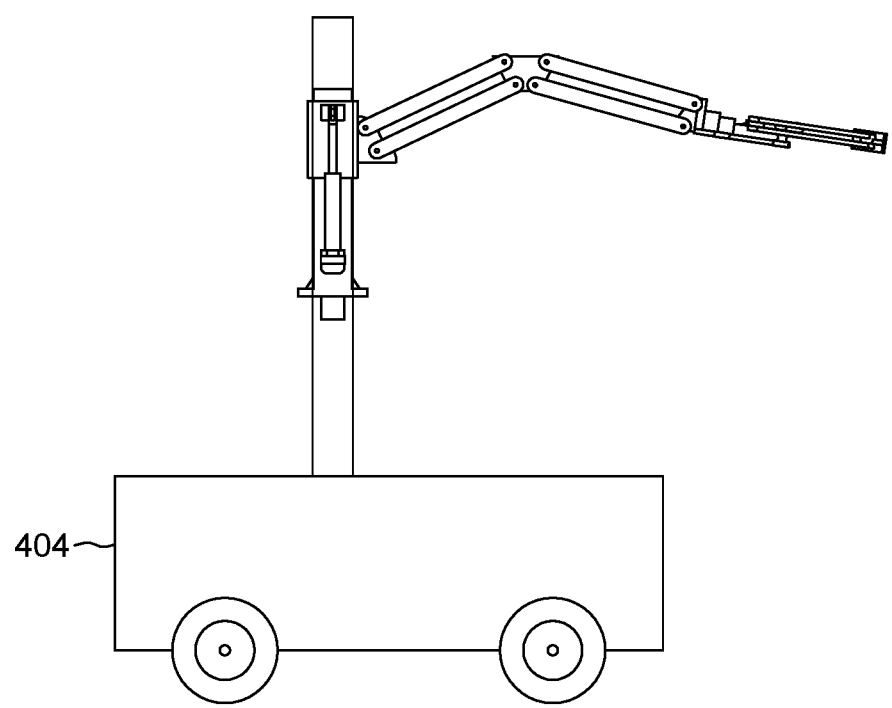
FIG. 4B illustrates a second embodiment of the image capturing device.

FIG. 4B illustrates a second embodiment of image capturing device 114. In the embodiment, autonomous robot 404 includes image capturing device 114. In addition, image analysis program 106 is integrated into image capturing device 114. In an embodiment, Autonomous robot 404 includes a jointed arm with a belt/gear/pully system and leverages that arm and one or more joints to position image capturing device 114 (not shown, but is attached to the end of the arm), to enable vertical movement of image capturing device 114, while a base of autonomous robot 404 leverages wheels to enable movement about the store. Autonomous robot 404 receives instructions from image analysis program 106 to adjust autonomous robot 404 to a recommended position for capturing an image of one or more products. The depiction of autonomous robot 404 is an example of an autonomous robot, and embodiments of autonomous robot 404 are not limited to the configuration shown in FIG. 4B. Both UAV 402 and autonomous robot 404 can leverage global positioning data and other forms of positioning to move about within a venue and to determine whether they are in the recommended position to capture the needed images in accordance with a given scenario and embodiment. In general, both UAV 402 and autonomous robot 404 leverage image recognition for obstacle avoidance and to determine characteristics of the surrounding environment, e.g., the presence of people/objects and their locations within the surrounding environment. In some embodiments, both UAV 402 and autonomous robot 404 may include a variety of sensors and receive data to determine the characteristics of their surrounding environment.

Figure 5:
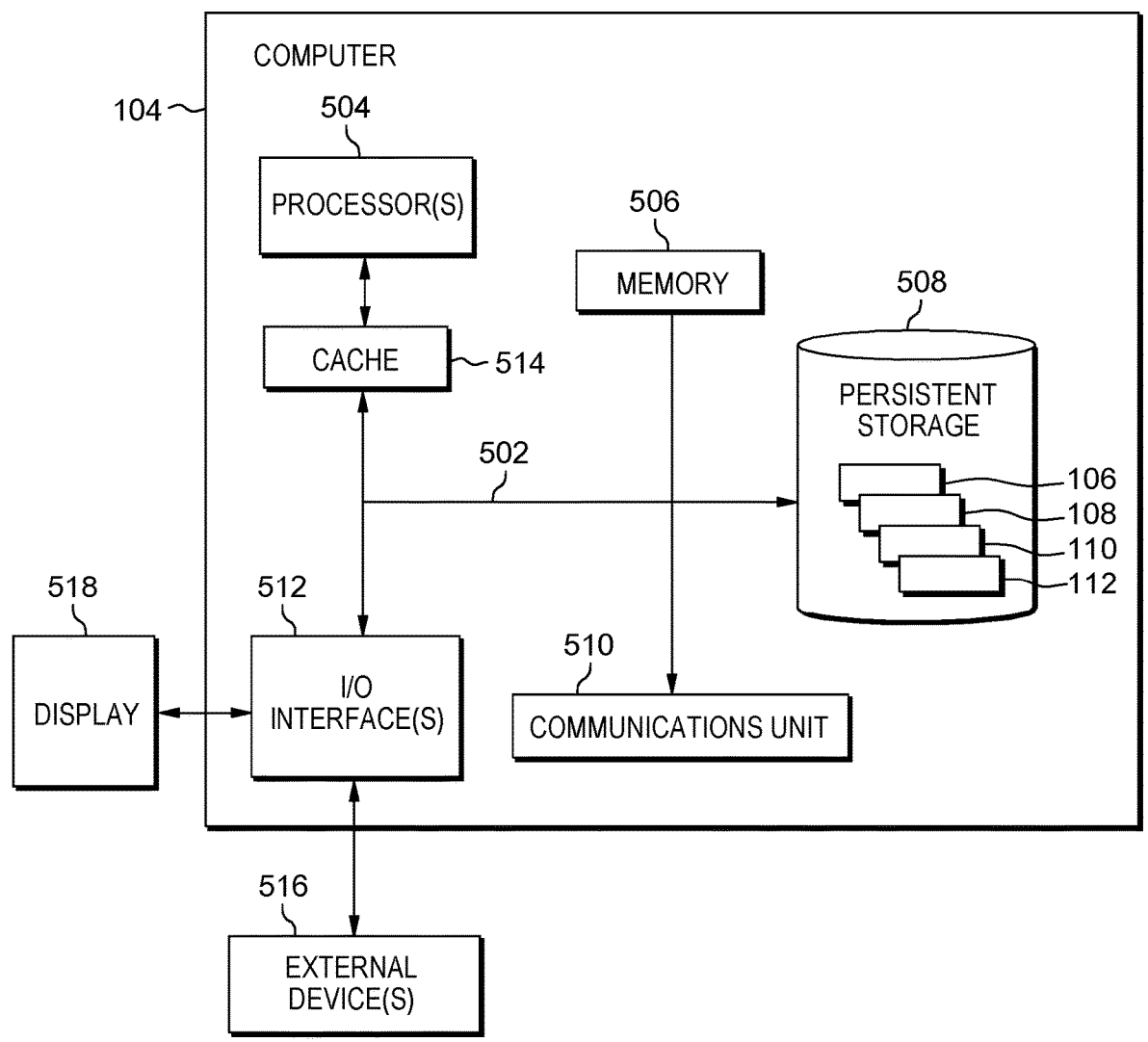
FIG. 5 depicts a block diagram of components of the server computer executing the image analysis program within the distributed data processing environment of FIG. 1, in accordance with an embodiment of the present invention.

FIG. 5 depicts a block diagram of components of server computer 104 within distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Server computer 104 can include processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention, e.g., image analysis program 106, product identification database 108, product location database 110 and product storage database 112, are stored in persistent storage 508 for execution and/or access by one or more of the respective processor(s) 504 of server computer 104 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of image capturing device 114. In these examples, communications unit 510 includes one or more network interface cards. Communications unit 510 may provide communications through the use of either or both physical and wireless communications links. Image analysis program 106, product identification database 108, product location database 110, and product storage database 112, and other programs and data used for implementation of the present invention, may be downloaded to persistent storage 508 of server computer 104 through communications unit 510.

I/O interface(s) 512 allows for input and output of data with other devices that may be connected to server computer 104. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media such as, for example, thumb drives, portable optical or magnetic disks, and memory cards. Software and data used to practice embodiments of the present invention, e.g., image analysis program 106, product identification database 108, product location database 110, and product storage database 112, can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor. Display 518 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, the method comprising:
   receiving, by one or more computer processors, one or more images of one or more products residing on a product storage location from an image capturing device;
   based on the received one or more images, determining, by one or more computer processors, a count of the one or more products;
   determining, by one or more computer processors, a confidence value in the count of the one or more products in the one or more images;
   responsive to determining the confidence value in the count of the one or more products is below a threshold, calculating, by one or more computer processors, a recommended position of the image capturing device to produce an improved image of the one or more products;
   transmitting, by one or more computer processors, instructions to the image capturing device to move to the recommended position;
   determining, by one or more computer processors, whether the image capturing device is in the recommended position;
   receiving, by one or more computer processors, the improved image taken by the image capturing device in the recommended position;
   based on the image capturing device being in the recommended position, determining, by one or more computer processors, the confidence value in the count of the one or more products meets the threshold;
   estimating, by one or more computer processors, an inventory quantity of the one or more products based on the improved image;
   determining, by one or more computer processors, the inventory quantity is below a pre-defined threshold; and
   responsive to determining the estimated inventory quantity is below a pre-defined threshold, automatically sending, by one or more computer processors, an order for the one or more products.

2. The method of claim 1, further comprising:
   retrieving, by one or more computer processors, an identification of the one or more products; and
   determining, by one or more computer processors, a location of the one or more products.

3. The method of claim 2, wherein the identification of the one or more products is selected from the group consisting of: a product name, a product description, a packaging type, a packaging color, a packaging description, a price associated with a product, one or more ingredients of a product, a quantity of a product within a packaging, and a barcode associated with a product.

4. The method of claim 2, wherein the location of the one or more products is selected from the group consisting of: a shelf number, a shelf location, one or more global positioning service (GPS) coordinates associated with a shelf, and a quick response (QR) code associated with a shelf.

5. The method of claim 1, wherein determining the count of the one or more products further comprises utilizing, by one or more computer processors, a Hough transform.

6. The method of claim 1, wherein determining the recommended position of the image capturing device to produce the improved image of the one or more products further comprises:
   measuring, by one or more computer processors, a distance of the one or more products from the image capturing device;
   measuring, by one or more computer processors, a gap between a top surface of the one or more products and a bottom surface of a shelf directly above the one or more products;
   determining, by one or more computer processors, a depth of the shelf on which the one or more products reside;
   based on the gap between the top surface of the one or more products and the bottom surface of a shelf directly above the one or more products, and on the depth of the shelf on which the one or more products reside, calculating, by one or more computer processor, an angle to which to adjust the image capturing device; and
   based on the calculated angle and on the depth of the shelf on which the one or more products reside and on the distance from the image capturing device to the one or more products, calculating, by one or more computer processors, the recommended position of the image capturing device to produce the improved image of the one or more products.

7. The method of claim 1, wherein determining the confidence value in the count of the one or more products is below the threshold corresponds to determining the image capturing device is perpendicular to a front facing surface of the one or more products, based on the received one or more images.

8. The method of claim 1, wherein determining whether the image capturing device is in the recommended position further comprises determining, by one or more computer processors, whether the image capturing device is within a pre-defined threshold distance and a pre-defined threshold angle of the recommended position.

9. The method of claim 1, further comprising:
responsive to determining the estimated inventory quantity is below a pre-defined threshold, automatically sending, by one or more computer processors, an alert to a consumer known to regularly purchase at least one of the one or more products.

10. The method of claim 1, wherein receiving the improved image further comprises:
determining a user of the image capturing device is within a threshold position of the recommended position; and
triggering, by one or more computer processors, the image capturing device to capture an image.

11. A computer program product, the computer program product comprising:
one or more computer readable storage media and program instructions stored on the one or more computer readable storage media, the stored program instructions comprising:
program instructions to receive one or more images of one or more products residing on a product storage location from an image capturing device;
based on the received one or more images, program instructions to determine a count of the one or more products;
program instructions to determine a confidence value in the count of the one or more products in the one or more images;
responsive to determining the confidence value in the count of the one or more products is below a threshold, program instructions to calculate a recommended position of the image capturing device to produce an improved image of the one or more products;
program instructions to transmit instructions to the image capturing device to move to the recommended position;
program instructions to determine whether the image capturing device is in the recommended position;
program instructions to receive the improved image taken by the image capturing device in the recommended position;
based on the image capturing device being in the recommended position, program instructions to determine the confidence value in the count of the one or more products meets the threshold;
program instructions to estimate an inventory quantity of the one or more products based on the improved image;
program instructions to determine the inventory quantity is below a pre-defined threshold; and
responsive to determining the estimated inventory quantity is below a pre-defined threshold, program instructions to automatically send an order for the one or more products.

12. The computer program product of claim 11, the stored program instructions further comprising:
program instructions to retrieve an identification of the one or more products; and
program instructions to determine a location of the one or more products.

13. The computer program product of claim 12, wherein the identification of the one or more products is selected from the group consisting of: a product name, a product description, a packaging type, a packaging color, a packaging description, a price associated with a product, one or more ingredients of a product, a quantity of a product within a packaging, and a barcode associated with a product.

14. The computer program product of claim 11, wherein the program instructions to determine the count of the one or more products comprise program instructions to utilize a Hough transform.

15. The computer program product of claim 11, wherein the program instructions to determine the recommended position of the image capturing device to produce the improved image of the one or more products comprise:
program instructions to measure a distance of the one or more products from the image capturing device;
program instructions to measure a gap between a top surface of the one or more products and a bottom surface of a shelf directly above the one or more products;
program instructions to determine a depth of the shelf on which the one or more products reside;
based on the gap between the top surface of the one or more products and the bottom surface of a shelf directly above the one or more products, and on the depth of the shelf on which the one or more products reside, program instructions to calculate an angle to which to adjust the image capturing device; and
based on the calculated angle and on the depth of the shelf on which the one or more products reside and on the distance from the image capturing device to the one or more products, program instructions to calculate the recommended position of the image capturing device to produce the improved image of the one or more products.

16. A computer system, the computer system comprising:
one or more computer processors;
one or more computer readable storage media;
program instructions stored on the one or more computer readable storage devices media for execution by at least one of the one or more computer processors, the stored program instructions comprising:
program instructions to receive one or more images of one or more products residing on a product storage location from an image capturing device;
based on the received one or more images, program instructions to determine a count of the one or more products;
program instructions to determine a confidence value in the count of the one or more products in the one or more images;
responsive to determining the confidence value in the count of the one or more products is below a threshold, program instructions to calculate a recommended position of the image capturing device to produce an improved image of the one or more products;
program instructions to transmit instructions to the image capturing device to move to the recommended position;
program instructions to determine the image capturing device is in the recommended position;
program instructions to receive the improved image taken by the image capturing device in the recommended position;
based on the image capturing device being in the recommended position, program instructions to determine the confidence value in the count of the one or more products meets the threshold;
program instructions to estimate an inventory quantity of the one or more products based on the improved image;
program instructions to determine the inventory quantity is below a pre-defined threshold; and responsive to determining the estimated inventory quantity is below a pre-defined threshold, program instructions to automatically send an order for the one or more products.

17. The computer system of claim 16, the stored program instructions further comprising:
   program instructions to retrieve an identification of the one or more products; and
   program instructions to determine a location of the one or more products.

18. The computer system of claim 16, wherein the program instructions to determine the count of the one or more products comprise program instructions to utilize a Hough transform.

19. The computer system of claim 16, wherein the program instructions to determine the recommended position of the image capturing device to produce the improved image of the one or more products comprise:
   program instructions to measure a distance of the one or more products from the image capturing device;
   program instructions to measure a gap between a top surface of the one or more products and a bottom surface of a shelf directly above the one or more products;
   program instructions to determine a depth of the shelf on which the one or more products reside;
   based on the gap between the top surface of the one or more products and the bottom surface of a shelf directly above the one or more products, and on the depth of the shelf on which the one or more products reside, program instructions to calculate an angle to which to adjust the image capturing device; and
   based on the calculated angle and on the depth of the shelf on which the one or more products reside and on the distance from the image capturing device to the one or more products, program instructions to calculate the recommended position of the image capturing device to produce the improved image of the one or more products.

* * * * *